US006981117B2

(12) United States Patent
Patel et al.

(10) Patent No.: US 6,981,117 B2
(45) Date of Patent: Dec. 27, 2005

(54) METHOD, SYSTEM, AND PROGRAM FOR TRANSFERRING DATA

(75) Inventors: Vishal Patel, San Jose, CA (US); Tu-An Cheng, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 10/354,691

(22) Filed: Jan. 29, 2003

(65) Prior Publication Data

US 2004/0148479 A1    Jul. 29, 2004

(51) Int. Cl.[7] .............................................. G06F 12/00
(52) U.S. Cl. ....................... 711/163; 711/156; 711/111; 711/112
(58) Field of Search ........................ 711/111, 112, 156, 711/161, 162, 163

(56) References Cited

U.S. PATENT DOCUMENTS

| 5,564,037 A | 10/1996 | Lam |
| 5,680,640 A | 10/1997 | Ofek et al. |
| 5,832,274 A | 11/1998 | Cutler et al. |
| 6,108,748 A | 8/2000 | Ofek et al. |
| 6,145,066 A | 11/2000 | Atkin |
| 6,178,487 B1 | 1/2001 | Ruff et al. |
| 6,199,073 B1 | 3/2001 | Peairs et al. |
| 6,240,486 B1 | 5/2001 | Ofek et al. |
| 6,275,898 B1 | 8/2001 | DeKoning |
| 6,324,581 B1 | 11/2001 | Xu et al. |
| 6,405,284 B1 * | 6/2002 | Bridge ........................ 711/114 |
| 6,772,309 B1 * | 8/2004 | Ohr et al. .................... 711/163 |
| 6,795,904 B1 * | 9/2004 | Kamvysselis ................ 711/162 |
| 2002/0184463 A1 * | 12/2002 | Arakawa et al. ............. 711/170 |
| 2003/0163655 A1 * | 8/2003 | McKean et al. ............. 711/154 |

OTHER PUBLICATIONS

IBM, "Utilizing a Client's I/O Buffer to Stage Data to a Shared Cache", Technical Disclosure Bulletin vol. 35, No. 2, Jul. 1992, pp. 20-21.
A.C. Snoeren, et al., "Fine-Grained Failover Using Connection Migration", MIT Laboratory for Computer Science Technical Report, MIT-LCS-TR-812.

* cited by examiner

Primary Examiner—B. James Peikari
Assistant Examiner—Woo H. Choi
(74) Attorney, Agent, or Firm—David W. Victor; Konrad Raynes & Victor LLP (57) ABSTRACT

Provided are a method, system, and program for transferring data from a source storage unit, wherein storage units are configured within a storage system. A data transfer operation is processed to transfer data from source storage blocks in a source storage unit to corresponding target storage blocks in a target storage unit. For each source storage block, before transferring data from one source storage block to the corresponding target storage block, indication is made that the source storage block is in a locked state. Data in the source storage block in the locked state is not accessible to a host data request, and wherein data in storage blocks that are not in the locked state is accessible to a host data request while the data transfer operation is pending. Indication is further made that the source storage block is not in the locked state after transferring the data in the source storage block to the corresponding target storage block the data in the source storage block to the corresponding target storage block.

36 Claims, 5 Drawing Sheets

METHOD, SYSTEM, AND PROGRAM FOR TRANSFERRING DATA

BACKGROUND OF THE INVENTION

1. Field of the Invention

The present invention relates to a method, system, and program for transferring data between storage units.

2. Description of the Related Art

In a computer system, data may be stored on one or more storage devices configured as logical units, referred to as volumes, logical unit numbers (LUNs), logical devices, etc. During system operations, the user or administrator may want to transfer data from one volume to another. One way to accomplish this task is to take the source volume offline and then copy the source volume data to a target volume. After the data transfer operation is complete, the data is accessible on the target volume.

One problem with data moving operations is that Input/Output (I/O) action is halted until the move operation is complete. If the volume being transferred is relatively large, then access to the data may be precluded for a relatively long period of time. If the volume being transferred is accessed in a network environment through a server, then numerous clients may be prevented from receiving data from the volume subject to the transfer. Further, there are likely to be more I/O requests directed to larger volumes than smaller volumes because larger volumes have more data that applications may want to access. Thus, larger volumes not only are unavailable longer to complete the data move, but are unavailable to a greater number of access requests during the data movement operation than smaller volumes.

During data movement operation, client applications attempting to access the volume subject to the move will have to delay processing until the move operation completes and the data is available. Such delays in receiving requested data may negatively impact the productivity of the client applications. Further, in network environments where access to data is critical, such as financial, medical, government, etc., such extensive delays in I/O access to a volume subject to a transfer can not only affect performance, but also disrupt operations and cause other attendant problems.

For these reasons, there is a need in the art for improved techniques for transferring data.

SUMMARY OF THE DESCRIBED IMPLEMENTATIONS

Provided are a method, system, and program for transferring data from a source storage unit, wherein storage units are configured within a storage system. A data transfer operation is processed to transfer data from source storage blocks in a source storage unit to corresponding target storage blocks in a target storage unit. For each source storage block, before transferring data from one source storage block to the corresponding target storage block, indication is made that the source storage block is in a locked state. Data in the source storage block in the locked state is not accessible to a host data request, and wherein data in storage blocks that are not in the locked state is accessible to a host data request while the data transfer operation is pending. Indication is further made that the source storage block is not in the locked state after transferring the data in the source storage block to the corresponding target storage block.

In further implementations, the storage blocks may have a size such that any delayed access to the storage block due to being set to the locked state as part of a pending data transfer operation will have a minimal effect on host operations requesting the storage block.

Still further, the storage units may be organized into a plurality of storage pools, wherein each storage pool has different data storage characteristics. In such case, the target storage unit is selected such that the selected storage unit is in a same storage pool as the source storage unit.

Further provided are a method, system, and program for processing data requests. A data request is received for requested data within a storage system, wherein data in the storage system is configured into a plurality of storage blocks, and wherein a lock is associated with each storage block indicating whether the storage block is being accessed as part of a pending data transfer operation. A determination is made of whether the locks associated with the storage blocks that include the requested data indicate that the storage blocks are being accessed as part of one pending data transfer operation. The requested data is accessed to return to the data request if the locks associated with the storage blocks that include the requested data do not indicate that at least one of the storage blocks are being accessed as part of one pending data transfer operation.

Described implementations provided techniques for transferring storage blocks from a target to source storage units in a manner that allows access to certain of the storage blocks involved in the data transfer operation during the pendency of the data transfer operation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
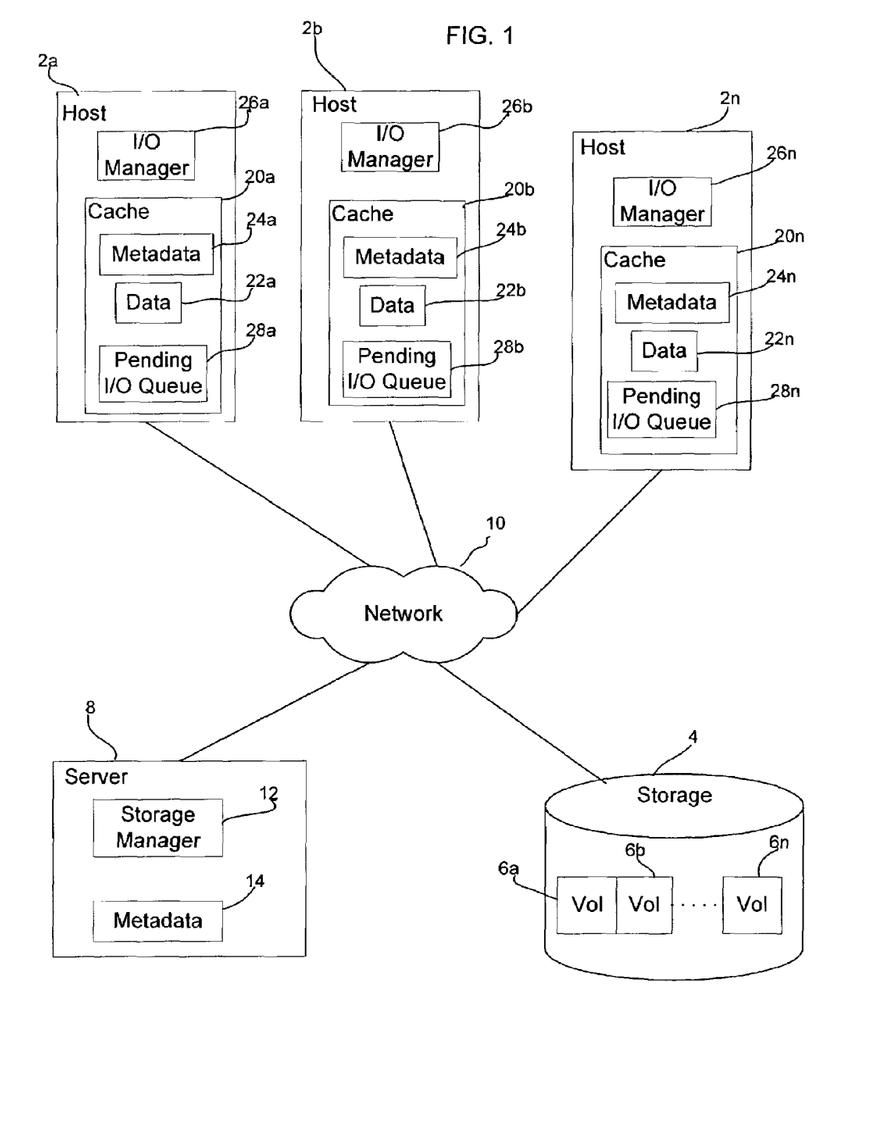
FIG. 1 illustrates a computing environment in which aspects of the invention are implemented.

FIG. 1 illustrates a computing architecture in which aspects of the invention are implemented. One or more hosts 2*a*, 2*b* . . . 2*n* are in data communication with a storage system 4 that is configured to have a plurality of logical volumes 6*a*, 6*b* . . . 6*n*. The hosts 2*a*, 2*b* . . . 2*n* may be any computing device known in the art, such as a server, mainframe, workstation, personal computer, hand held computer, laptop, telephony device, network appliance, etc. The storage system 4 may be comprised of hard disk drives, tape cartridge libraries, optical disks, or any suitable non-volatile storage medium known in the art. The storage system 4 may be arranged as an array of storage devices, such as a Just a Bunch of Disks (JBOD), DASD, Redundant Array of Independent Disks (RAID) array, virtualization device, etc. Further, the storage system 4 may have different types of storage devices. A server 8 may comprise any server class machine known in the art. In further implementations, the server 8 may be implemented as a cluster of interconnected separate server machines that include a distributed file management system. The storage 4, storage controller 8 and host system(s) 2a, 2b . . . 2n communicate via a network 10, which may comprise a Storage Area Network (SAN), Local Area Network (LAN), Intranet, the Internet, Wide Area Network (WAN), etc.

The server 8 further includes a storage manager 12 program that manages the data volumes 6a, 6b . . . 6n in the storage system 4. The storage manager 12 maintains metadata 14 on the data stored in the storage system 4. Further, the hosts 2a, 2b . . . 2n each include a cache 20a, 20b . . . 20n that includes cached data volumes 22a, 22b . . . 22n from the storage 4 as well as metadata 24a, 24b . . . 24n generated and received from the storage manager 12. The metadata 24 provides information on the data volumes 22 stored in the cache 20a, 20b . . . 20n. Each host 2a, 2b . . . 2n further includes an I/O manager program 26a, 26b . . . 26n to handle I/O requests from connected devices. The I/O managers 26a, 26b . . . 26n queue I/O requests in a pending I/O queue 16 if the host metadata 24a, 24b . . . 24n indicates that a target location of data volumes 22a, 22b . . . 24n from the storage 4 is locked or being accessed as part of a data move operation.

In certain implementations, each volume 6a, 6b . . . 6n is comprised of one or more partitions. Each partition defines a specific physical region on the physical devices in the storage system 4. A volume 6a, 6b . . . 6n can be assigned partitions, where different partitions for one volume define non-contiguous physical storage locations. In certain implementations, a partition may have a size such that the time to read and write an entire partition is negligible from a user standpoint, such as a partition size of 4 to 64 megabytes.

Further, volumes may be assigned to a storage pool. A storage pool groups storage volumes according to some criteria or classification. A storage pool may define volumes that are configured in storage devices according to the data access rates and availability of data in the storage devices in the pool. For instance, one storage pool may include volumes stored in storage devices that have faster access rates and greater availability, such as a high level RAID configuration. Users whose data is of higher priority or who pay more than other users may have their data stored in volumes in a storage pool with storage systems that are relatively more expensive, have faster data access rates, and greater data protection (e.g., high level RAID configuration, redundancy, backup, etc.). Users whose data is of relative less importance or who pay less for a storage service, may have their data stored in volumes in storage pools having storage systems or devices that are relatively less expensive, i.e., have a slower access rate and less availability. Volumes in a same storage pool and volumes in different storage pools may be stored on different or the same storage devices.

Figure 2:
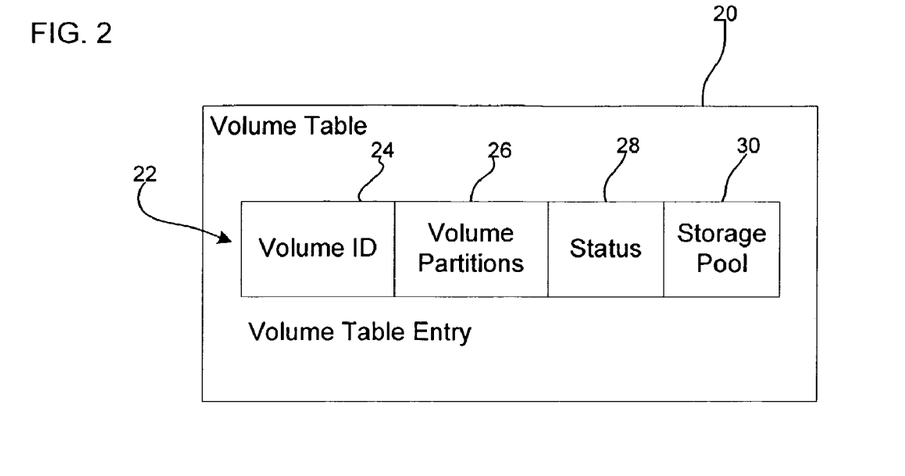
FIGS. 2, 3, and 4 illustrate the metadata on data maintained in the storage system used in accordance with implementations of the invention.
Figure 3:
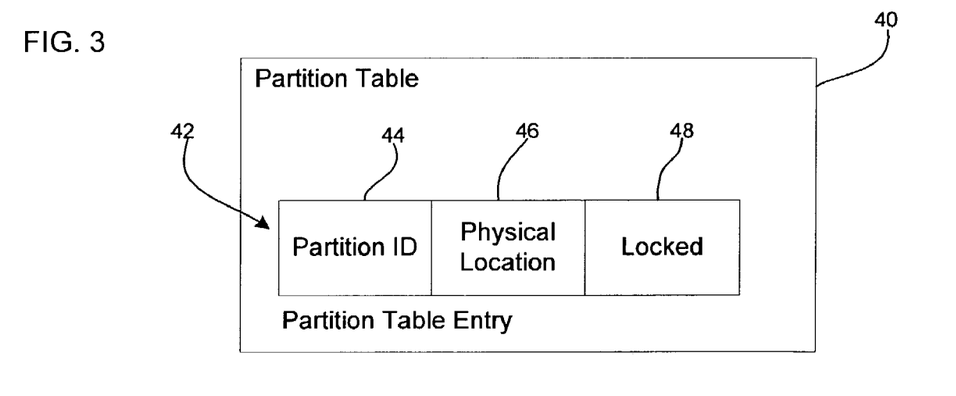
Figure 4:
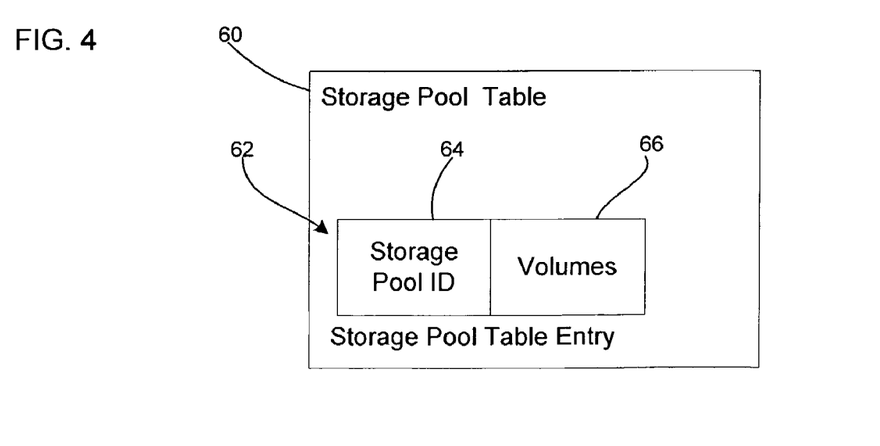

FIGS. 2, 3, and 4 illustrate the content of the metadata 14 as including a volume table 20 (FIG. 2), a partition table 40 (FIG. 3), and a storage pool table 60 (FIG. 4). Certain of the metadata, such as the partition table 40 may be maintained with the host metadata 24. With respect to FIG. 2, the volume table 20 includes a volume entry 22 for each volume 6a, 6b . . . 6n configured in the storage system 4. Each volume entry 22 indicates a volume identifier (ID) 24 used to reference the volume; one or more volume partitions 26 indicating the partitions of physical data that are assigned to the volume (which may be non-contiguous or contiguous partitions); a status field 28 indicating whether the volume includes active user data or is empty; and a storage pool field 30 indicating a storage pool to which the volume is assigned or that the volume is not assigned to a storage pool.

With respect to FIG. 3, the partition table 40 includes a partition entry 42 for each partition configured in the storage system 4. Each partition entry 42 includes a partition ID 44 used to reference the partition; physical location information 46 identifying the physical location in the storage system in which the partition is implemented (e.g., a fixed block address, cylinder, head, track, sector ID, block on tape, etc.); and a locked field 48 indicating whether a data movement operation has exclusive access to the partition.

FIG. 4 illustrates a storage pool table 60 that includes a storage pool entry 62 for each defined storage pool in the storage 4. Each storage pool entry 62 includes a storage pool ID 64 that is used to reference the storage pool and a volumes field 66 indicating the one or more volumes that are assigned to that storage pool.

Figure 5:
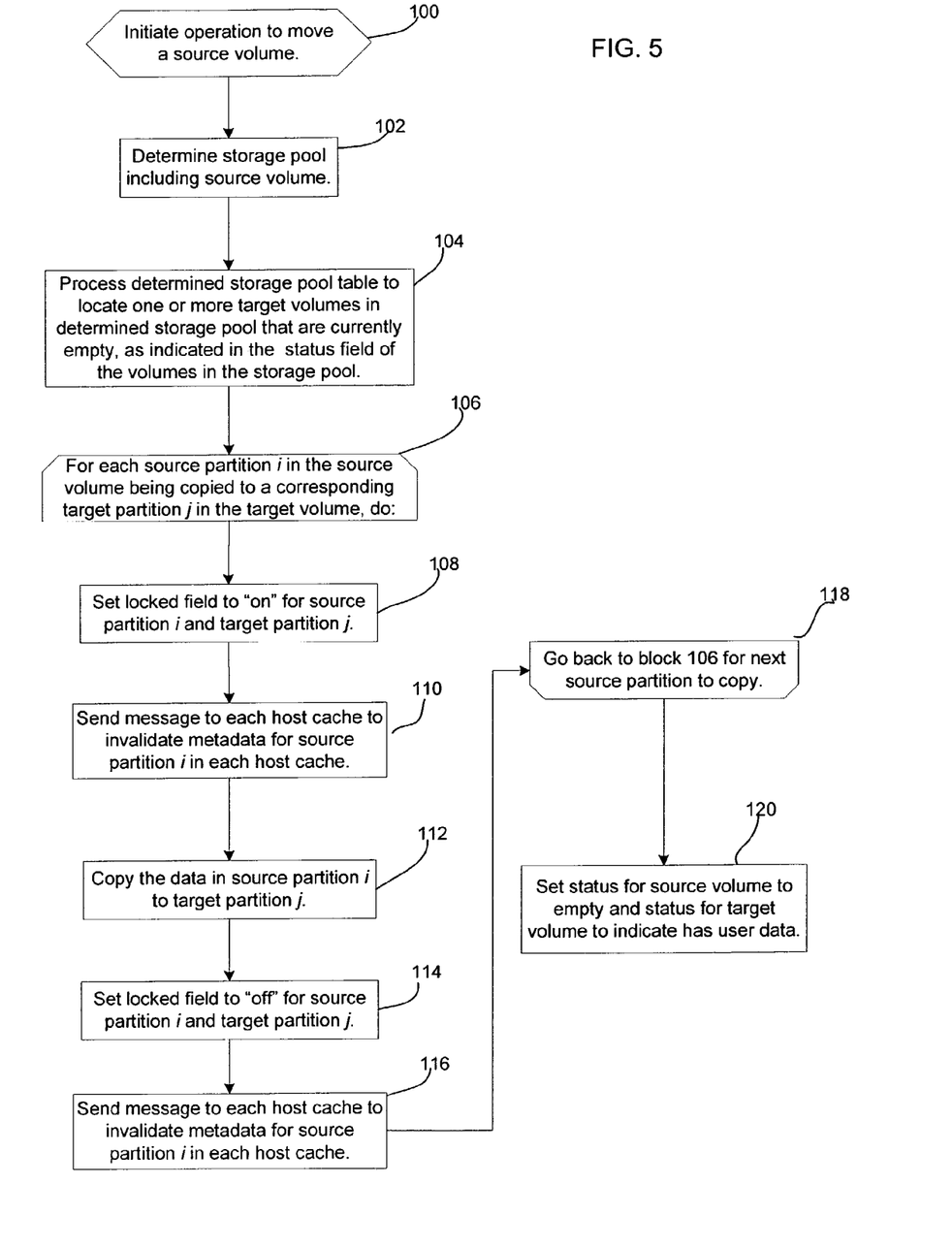
FIGS. 5, 6, and 7 illustrate logic to handle data movement operations in accordance with implementations of the invention.

Described implementations provide techniques for moving the data from one volume to another in a manner that minimizes the time during which partitions in the volume are unavailable to host 2a, 2b . . . 2n access requests during the move of the volume to a target volume. FIG. 5 illustrates operations performed by the storage manager 12 to move data in one volume 6a, 6b . . . 6n to another volume. Control begins at block 100 to initiate an operation to move data from a source volume to a target volume. This operation may be initiated from one of the hosts 2a, 2b . . . 2n to the server 8 or at the server 8. The storage manager 12 determines (at block 102) the storage pool including the source volume from the storage pool table 60, i.e., the storage pool table entry 62 having the source volume listed in its volume(s) field 66. The storage manager 12 then processes (at block 104) the determined storage pool table 60 to locate one or more target volumes in the same storage pool that are currently empty, i.e., volumes indicated in the volume field 66 of the storage pool table entry 62 (FIG. 4) whose status field 28 in the volume table entry 22 indicates that the volume is empty. Depending on the size of available empty possible volumes 6a, 6b . . . 6n in the same storage pool, one or more available storage pools may be used for the target storage pools. In alternative implementations, an administrator may select the target volume(s) to receive the source volume data.

Blocks 106–116 illustrates an implementation of a loop performed to move data from the source volume to the target volume for each source partition i of the source volume indicated in the volume partitions 26 in the volume table entry 22 for the source volume. In performing the data move, data is copied from a source partition i to a corresponding target partition j in the target volume(s). At block 108, the storage manager 12 sets the locked field 48 (FIG. 3) for the source i and target j partitions to indicate that those partitions are locked (i.e., unavailable due to data movement operations). The storage manager 12 further sends (at block 110) a message to each host 2a, 2b . . . 2n to invalidate the partition table entry 42 in the host metadata 24a, 24b . . . 24n for the source partition i, and target partition j in each host cache 20a, 20b . . . 20n. The storage manager 12 maintains a list of all attached hosts 2a, 2b . . . 2n. The storage manager 12 then copies (at block 112) the data from the source partition i to the target j partition. After copying the source partition i, the locked fields 48 for the source i and target j partitions are set (at block 114) to "off" to indicate that the data is available for I/O access. The storage manager 12 then sends (at block 116) a message to each host cache 20a, 20b . . . 20n to invalidate metadata for source partition i in each host cache. Invalidating the metadata in host cache when updating the metadata will cause the host to access the most recent version of the metadata before proceeding. In certain implementations, the locked field 48 is used to indicate whether a partition is locked for a data move operation. Additional locks may be used to prevent access conflicts for I/O requests. Control then proceeds (at block 118) back to block 106 to copy the next source partition in the source volume. After copying all the source partitions, the storage manager 12 sets (at block 120) the status 28 for the source volume to empty and the status 28 for the target volume to indicate that user data is maintained in the target volume.

Figures 6, 7:
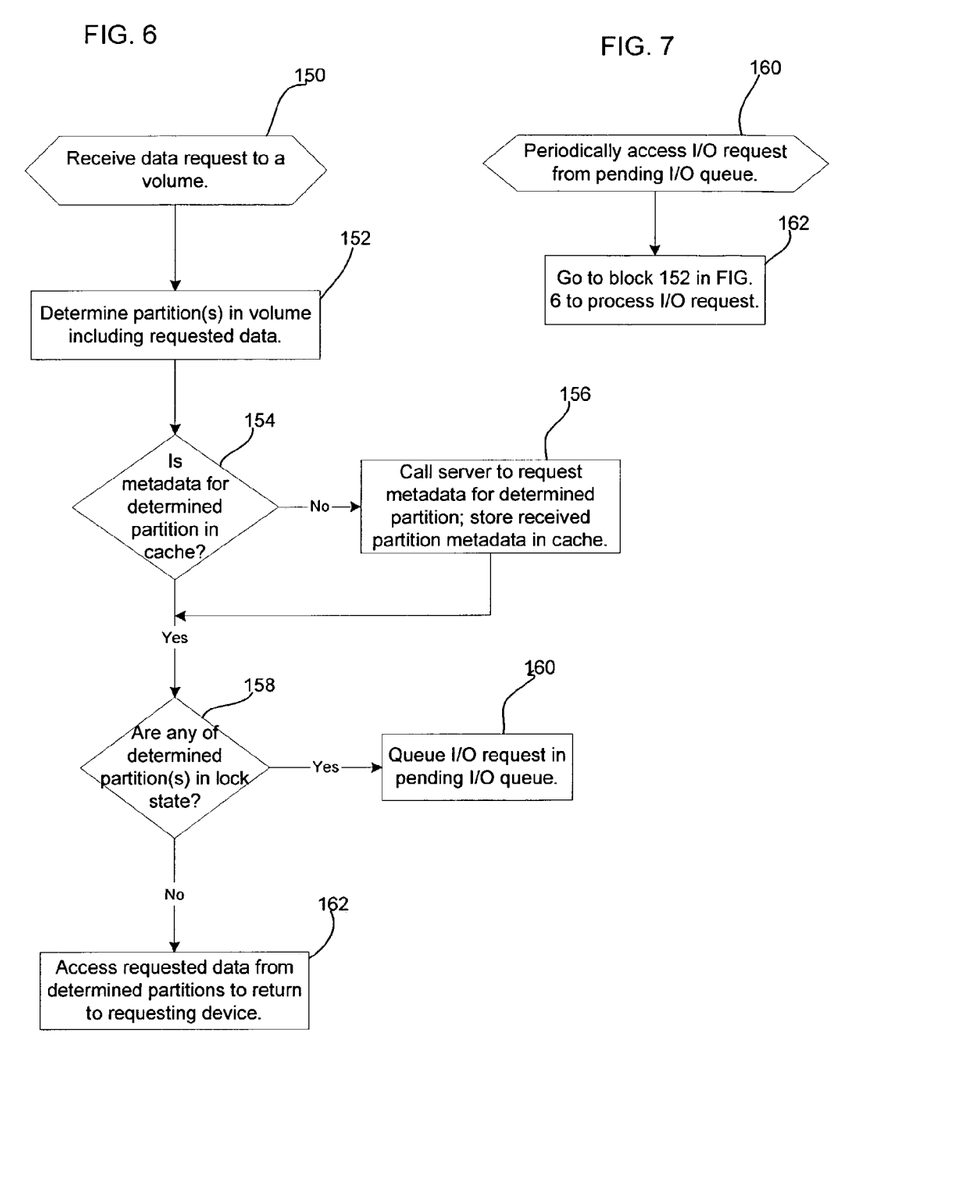

FIGS. 6 and 7 illustrate logic implemented in the host I/O managers 26a, 26b . . . 26n to handle host 2a, 2b . . . 2n I/O requests directed to volumes 6a, 6b . . . 6n in storage 4. With respect to FIG. 6, control begins at block 150 upon receiving a host I/O request directed to a volume. In response, the I/O manager 20a, 20b . . . 20n determines (at block 152) the one or more partitions in the volume including the requested data. Requested data may be included in partitions within a single volume or in partitions that span a volume. If (at block 154) the metadata 24a, 24b . . . 24n for the partition, which includes the partition table entry 42 (FIG. 3), is not in the host cache 20a, 20b . . . 20n, then the I/O manager 26a, 26b . . . 26n calls (at block 156) the server 8 for the partition table entry 42 for the determined partition. If the needed metadata 24a, 24b . . . 24n for the determined partition is in host cache 20a, 20b . . . 20n or after accessing the needed metadata 24 from the server 8, the I/O manager 26a, 26b . . . 26n determines (at block 158) whether at least one of the determined partitions are in a locked state, as indicated by the locked field 48 in the entries 42 in the partition table 40 (FIG. 3) for the determined partitions. If so, then the I/O manager 26a, 26b . . . 26n queues (at block 160) the I/O request in the pending I/O request queue 28a, 28b . . . 28n. Otherwise, if the determined partitions are not locked, then the requested data is accessed (at block 162) and returned to the requesting device initiating the request to the host 2a, 2b . . . 2n.

With respect to FIG. 7, the host I/O managers 26a, 26b . . . 26n periodically processes their pending I/O request queue 28a, 28b . . . 28n. The I/O managers 26a, 26b . . . 26n may process queued I/O request on a first-in-first-out basis (FIFO) or according to any other queuing algorithm known in the art, including priority based queuing methods. Upon accessing an I/O request, control proceeds to block 152 in FIG. 6 to process the I/O request.

With the described implementations, if a partition is locked because it is subject to a data move operation, then the host request is delayed until the partitions including the requested data are freed by the data movement operation. As mentioned, the partition size is set such that the time to perform the data movement operation for a particular source partition is negligible from the perspective of the host application requesting the data such that any delay while waiting for a locked partition to become available is unlikely to effect host operations.

Described implementations improve host I/O access performance because the data the host requests may only comprise a subset of the partitions in a volume subject to the data movement operation. Because only the partition subject to the data movement is locked, the host may access the other partitions that are the subject of the move. In further implementations, the storage manager 12 may sequentially process the partitions including the data requested by the host. If a host request partition is not locked due to a data movement operation, then that particular partition is returned. If the host requested partition is in the locked state, then the host I/O request is delayed until the data movement operation with respect to the locked partition is released and available to return to the host. This implementation ensures that a host I/O access request is only delayed by the time needed to copy a single partition, as opposed to all partitions subject to the move operation.

Additional Implementation Details

The described techniques for copying data and handling I/O requests may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations concerned the movement of volumes. However, any type of logical storage unit may be subject to the data movement operations, such as a logical unit number, logical device, etc. Further, the storage unit subject to the data movement operations may comprise a file in a logical device, and not the entire logical device itself. The subcomponents of the storage units were described as partitions. A partition may comprise any chunk or range of physical addresses in a physical device, such as a range of fixed block addresses, etc. Alternatively, the partitions may comprise a range of logical addresses that map to physical locations on storage.

FIGS. 2, 3, and 4 illustrate tables used to store the metadata information on the data stored in the storage system 4. Those skilled in the art will appreciate that the information described with respect to FIGS. 2, 3, and 4 may be organized and stored in many different formats, including, but not limited to, the format of three tables described with respect to FIGS. 2, 3, and 4. Further, additional information may also be provided with the metadata.

The illustrated logic of FIGS. 5–7 show certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The variables i and j are used to denote any integer variable for certain of the described elements and may indicate a same or different integer value when used in different instances.

Figure 8:
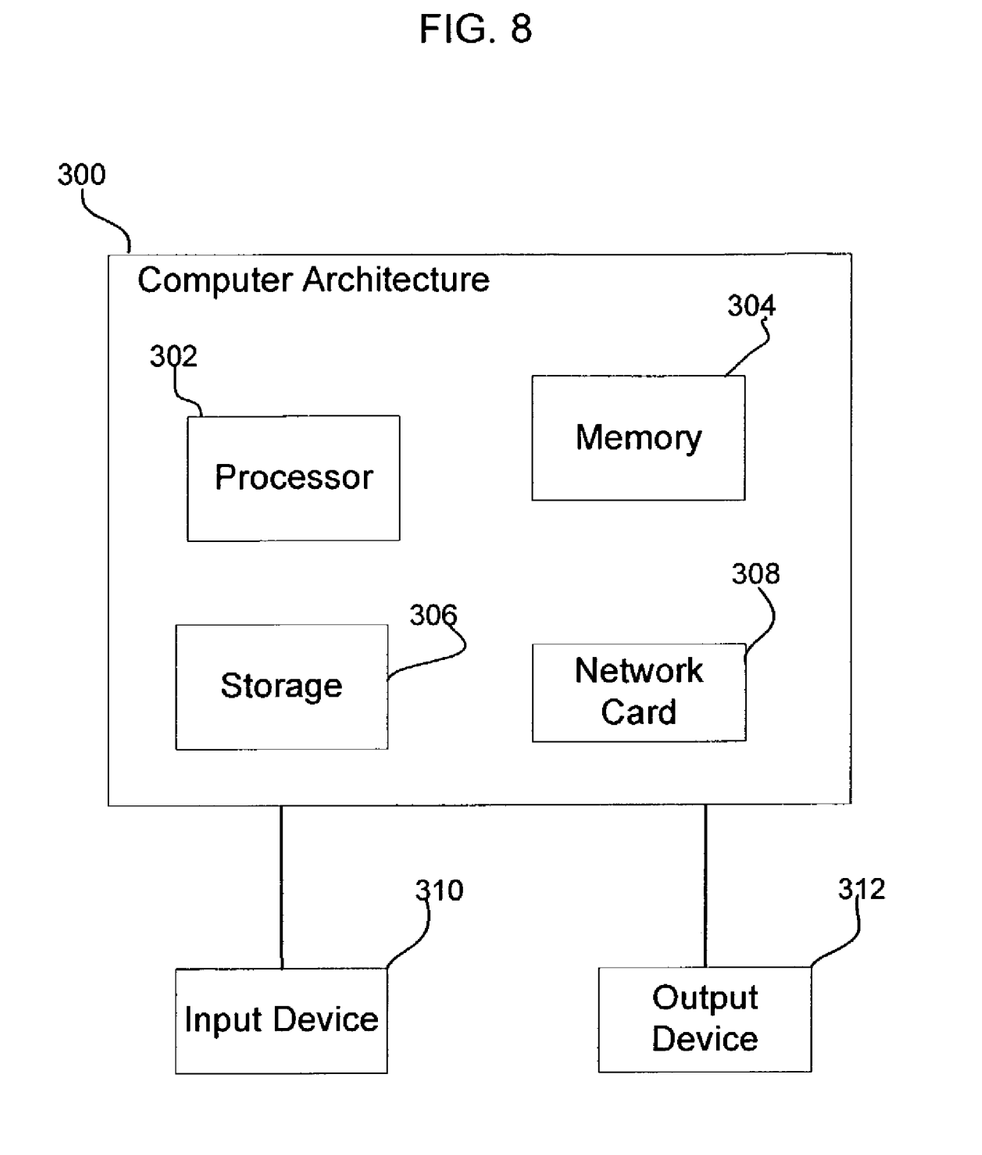
FIG. 8 illustrates an architecture of computing components in the network environment, such as the hosts and server, and any other computing devices.

FIG. 8 illustrates one implementation of a computer architecture 300 of the network components, such as the hosts and server shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transferring data from source storage units to target storage units, wherein the source and target storage units are configured within a computer mass storage system, comprising:
   processing a data transfer operation to transfer data from source storage blocks in one source storage unit to corresponding target storage blocks in one target storage unit; and
   for each source storage block, performing:
   (i) before transferring data from one source storage block to the corresponding target storage block, indicating that the source storage block is in a locked state and transmitting a message to host systems capable of requesting data from the source storage block to invalidate information for the source storage block maintained in the host systems, wherein data in the source storage block in the locked state is not accessible to a host data request, and wherein data in storage blocks that are not in the locked state is accessible to the host data request while the data transfer operation is pending; and
   (ii) indicating that the source storage block is not in the locked state after transferring the data in the source storage block to the corresponding target storage block.

2. The method of claim 1, wherein each storage block defines contiguous physical storage locations in the computer mass storage system.

3. The method of claim 2, wherein the storage units comprise logical volumes and the storage blocks comprise partitions.

4. The method of claim 1, wherein the storage blocks have a size such that any delayed access to the storage blocks due to being set to the locked state as part of a pending data transfer operation will have a minimal effect on host operations requesting the storage blocks.

5. The method of claim 4, wherein each storage block is approximately four to sixty-four megabytes in size.

6. The method of claim 1, wherein the data transfer operation comprises an operation to move data from the source storage unit to the target storage unit.

7. The method of claim 1, wherein storage units are organized into a plurality of storage pools, wherein each storage pool has different data storage characteristics, further comprising:
   selecting the target storage unit, wherein the selected storage unit is in a same storage pool as the source storage unit.

8. The method of claim 7, wherein selecting the target storage unit further comprises determining one storage unit that is empty and in the same storage pool as the source storage unit.

9. The method of claim 1, wherein invalidating the information for the source storage block in the host systems causes the host systems to request updated information for the source storage block indicating whether the source storage block is in the locked state in response to the host attempting to access the source storage block.

10. A method for processing data requests at a host system in communication with a computer mass storage system, comprising:
    receiving a data request from a requestor for requested data within the computer mass storage system, wherein data in the computer mass storage system is configured into a plurality of storage blocks, and wherein a plurality of locks are associated with the storage blocks, and wherein each of the locks indicates whether one corresponding storage block is being accessed as part of a pending data transfer operation;
    receiving a message to invalidate information for an indicated storage block in response to one other host system obtaining the lock to the indicated storage block to perform a data transfer operation with respect to storage blocks in the storage unit including the indicated storage block;
    determining whether the locks associated with the storage blocks that include the requested data indicate that the storage blocks are being accessed as part of one pending data transfer operation; and
    accessing the requested data to return to the requestor if the locks associated with the storage blocks that include the requested data do not indicate that at least one of the storage blocks are being accessed as part of one pending data transfer operation.

11. The method of claim 10, further comprising:
    delaying processing of the data request if the locks associated with the storage blocks that include the requested data indicate that at least one of the storage blocks are being accessed as part of one pending data transfer operation.

12. The method of claim 11, wherein the processing of the data request is delayed until the locks of the storage blocks including the requested data indicate that the storage blocks are not being accessed as part of one pending data transfer operation.

13. The method of claim 11, wherein delaying the processing of the data request comprises adding the data request to a queue, further comprising:
processing one queued data request if the locks associated with the storage blocks including the requested data for the queued data request indicate that the storage blocks are not being accessed as part of one pending data transfer operation.

14. The method of claim 10, further comprising:
determining whether there is information for the storage blocks that include the requested data, including locking information; and
accessing the information for the storage blocks in response to determining that there is no information for the storage blocks that include the requested data.

15. A system for transferring data from source storage units to target storage units, wherein the source and target storage units are configured within a computer mass storage system, and wherein the system is in communication with host systems that include information on storage units within the computer mass storage system to use to transmit data requests to the computer mass storage system, comprising:
means for processing a data transfer operation to transfer data from source storage blocks in one source storage unit to corresponding target storage blocks in one target storage unit; and
means for performing for each source storage block:
(i) before transferring data from one source storage block to the corresponding target storage block, indicating that the source storage block is in a locked state and transmitting a message to the host systems capable of requesting data from the source storage block to invalidate information for the source storage block maintained in the host systems, wherein data in the source storage block in the locked state is not accessible to a host data request, and wherein data in storage blocks that are not in the locked state is accessible to the host data request while the data transfer operation is pending; and
(ii) indicating that the source storage block is not in the locked state after transferring the data in the source storage block to the corresponding target storage block.

16. The system of claim 15, wherein the storage blocks have a size such that any delayed access to the storage blocks due to being set to the locked state as part of a pending data transfer operation will have a minimal effect on host operations requesting the storage blocks.

17. The system of claim 15, wherein storage units are organized into a plurality of storage pools, wherein each storage pool has different data storage characteristics, further comprising:
means for selecting the target storage unit, wherein the selected storage unit is in a same storage pool as the source storage unit.

18. The system of claim 15, wherein invalidating the information for the source storage block in the host systems causes the host systems to request updated information for the source storage block indicating whether the source storage block is in the locked state in response to the host attempting to access the source storage block.

19. A system for processing data requests from a requestor to data within a computer mass storage system configured into a plurality of storage blocks, wherein the system is in communication with the computer mass storage system and wherein host systems are also in communication with the computer mass storage system, comprising:
means for receiving a data request from the requestor for requested data within the computer mass storage system;
means for associating a plurality of locks with the storage blocks, wherein each of the locks indicates whether one corresponding storage block is being accessed as part of a pending data transfer operation;
means for receiving a message to invalidate information for an indicated storage block in response to one of the host systems obtaining the lock to the indicated storage block to perform a data transfer operation with respect to storage blocks in the storage unit including the indicated storage block;
means for determining whether the locks associated with the storage blocks that include the requested data indicate that the storage blocks are being accessed as part of one pending data transfer operation; and
means for accessing the requested data to return to the requestor if the locks associated with the storage blocks that include the requested data do not indicate that at least one of the storage blocks are being accessed as part of one pending data transfer operation.

20. The system of claim 19, further comprising:
means for delaying processing of the data request if the locks associated with the storage blocks that include the requested data indicate that at least one of the storage blocks are being accessed as part of one pending data transfer operation.

21. The system of claim 20, further comprising:
a queue, wherein the means for delaying the processing of the data request adds the data request to the queue; and
means for processing one queued data request if the locks associated with the storage blocks including the requested data for the queued data request indicate that the storage blocks are not being accessed as part of one pending data transfer operation.

22. The system of claim 19, further comprising:
means for determining whether there is information for the storage blocks that include the requested data, including locking information; and
means for accessing the information for the storage blocks in response to determining that there is no information for the storage blocks that include the requested data.

23. An article of manufacture implemented in a computer readable medium including code executed to transfer data from source storage units to target storage units, wherein the source and target storage units are configured within a computer mass storage system, wherein host systems include information on the storage units within the computer mass storage system to use to transmit data requests to the storage system, and wherein the code causes operations to be performed, the operations comprising:
processing a data transfer operation to transfer data from source storage blocks in one source storage unit to corresponding target storage blocks in one target storage unit; and
for each source storage block, performing:
(i) before transferring data from one source storage block to the corresponding target storage block, indicating that the source storage block is in a locked state and transmitting a message to the host systems capable of requesting data from the source storage block to invalidate information for the source storage block maintained in the host systems, wherein data in the source storage block in the locked state is not accessible to a host data request, and wherein data in storage blocks that are not in the locked state is accessible to the host data request while the data transfer operation is pending; and (ii) indicating that the source storage block is not in the locked state after transferring the data in the source storage block to the corresponding target storage block.

24. The article of manufacture of claim 23, wherein each storage block defines contiguous physical storage locations in the computer mass storage system.

25. The article of manufacture of claim 24, wherein the storage units comprise logical volumes and the storage blocks comprise partitions.

26. The article of manufacture of claim 23, wherein the storage blocks have a size such that any delayed access to the storage blocks due to being set to the locked state as part of a pending data transfer operation will have a minimal effect on host operations requesting the storage blocks.

27. The article of manufacture of claim 26, wherein each storage block is approximately four to sixty-four megabytes in size.

28. The article of manufacture of claim 23, wherein the data transfer operation comprises an operation to move data from the source storage unit to the target storage unit.

29. The article of manufacture of claim 23, wherein storage units are organized into a plurality of storage pools, wherein each storage pool has different data storage characteristics, wherein the operations further comprise:

selecting the target storage unit, wherein the selected storage unit is in a same storage pool as the source storage unit.

30. The article of manufacture of claim 29, wherein selecting the target storage unit further comprises determining one storage unit that is empty and in the same storage pool as the source storage unit.

31. The article of manufacture of claim 23, wherein invalidating the information for the source storage block in the host systems causes the host systems to request updated information for the source storage block indicating whether the source storage block is in the locked state in response to the host attempting to access the source storage block.

32. An article of manufacture implemented in a computer readable medium including code executed to process data requests from a requestor and communicate with a computer mass storage system and wherein host systems are in communication with the computer mass storage system, wherein the code is executed to perform operations comprising:

receiving a data request from the requestor for requested data within the computer mass storage system, wherein data in the storage system is configured into a plurality of storage blocks, and wherein a plurality of locks are associated with the storage blocks, and wherein each of the locks indicates whether one corresponding storage block is being accessed as part of a pending data transfer operation;

receiving a message to invalidate information for an indicated storage block in response to one of the host systems obtaining the lock to the indicated storage block to perform a data transfer operation with respect to storage blocks in the storage unit including the indicated storage block;

determining whether the locks associated with the storage blocks that include the requested data indicate that the storage blocks are being accessed as part of one pending data transfer operation; and accessing the requested data to return to the requestor if the locks associated with the storage blocks that include the requested data do not indicate that at least one of the storage blocks are being accessed as part of one pending data transfer operation.

33. The article of manufacture of claim 32, wherein the operations further comprise:

delaying processing of the data request if the locks associated with the storage blocks that include the requested data indicate that at least one of the storage blocks are being accessed as part of one pending data transfer operation.

34. The article of manufacture of claim 33, wherein the processing of the data request is delayed until the locks of the storage blocks including the requested data indicate that the storage blocks are not being accessed as part of one pending data transfer operation.

35. The article of manufacture of claim 34, wherein delaying the processing of the data request comprises adding the data request to a queue, wherein the operations further comprise:

processing one queued data request if the locks associated with the storage blocks including the requested data for the queued data request indicate that the storage blocks are not being accessed as part of one pending data transfer operation.

36. The article of manufacture of claim 32, wherein the operations further comprise:

determining whether there is information for the storage blocks that include the requested data, including locking information; and accessing the information for the storage blocks in response to determining that there is no information for the storage blocks that include the requested data.

* * * * *